June 12, 1934.  I. C. CARPENTER  1,962,580

CHILLING

Filed Jan. 18, 1929  2 Sheets-Sheet 1

Fig. 1.

INVENTOR
Irving C. Carpenter
BY Kenyon & Kenyon
ATTORNEYS

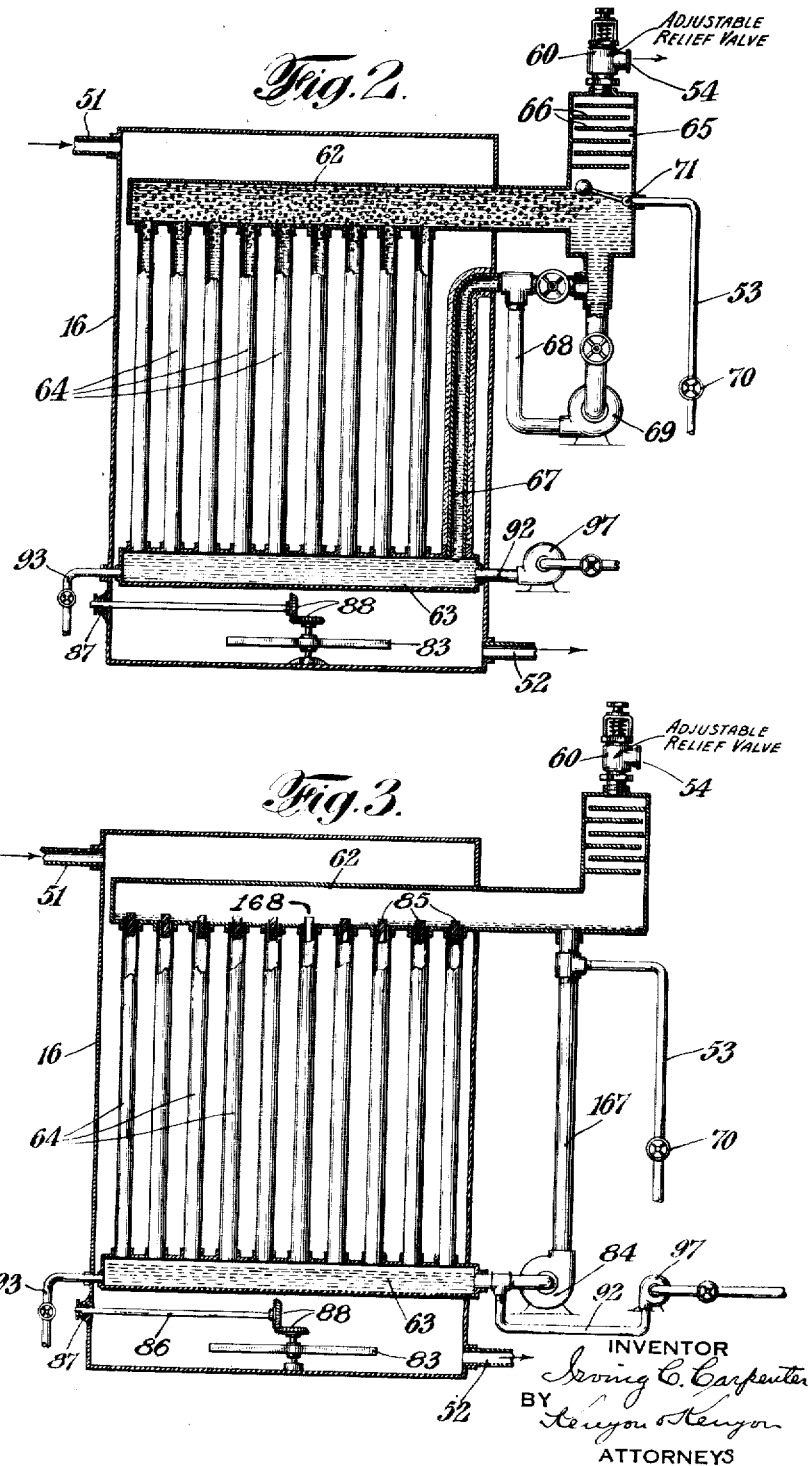

Patented June 12, 1934

1,962,580

UNITED STATES PATENT OFFICE 1,962,580

CHILLING

Irving C. Carpenter, New Rochelle, N. Y., assignor to Max B. Miller & Co. Inc., New York, N. Y., a corporation of Delaware Application January 18, 1929, Serial No. 333,285

38 Claims. (Cl. 62—170)

This invention relates to the chilling of fluids and in particular to the chilling of oil for the purpose of precipitating therein substances, such as wax, that may be precipitated by the chilling of the oil.

So far as my invention is applied to the dewaxing of oil it is immaterial from what source the oil is derived inasmuch as the oil may be crude petroleum oil or a fraction, or residue thereof, or vegetable oil, or animal oil, or oil produced in the destructive distillation of carbonaceous material or shale.

It is an object of my invention to provide a process and apparatus for the chilling of fluids that are highly economical, relatively rapid in effect, capable of effecting intense chilling, and capable of such control that uniform chilling may be effected and shock chilling may be avoided by maintaining a predetermined temperature differential between the material to be chilled and the chilling medium.

In the practice of this process and in apparatus embodying this invention, the chilling occurs in three general steps which may be employed separately and which when so employed constitute separate parts of my invention, but which may be employed conjointly and which when so employed cooperate with one another to produce special advantages resulting from the cooperative relation of the three steps.

In the first of such steps fluid to be chilled is passed in heat exchange relation to some of the same fluid that has previously been chilled. A feature of this step is that the previously chilled fluid is passed in heat exchange relation with the fluid to be chilled at such a rate that the chilling is effected at a substantially uniform rate throughout the period in which heat exchange relation exists; and to assist in the maintaining of that condition previously chilled fluid that has already passed in heat exchange relation with fluid to be chilled, and is reheated, is combined with chilled fluid entering into the heat exchange relation, in a predetermined proportion that will ensure a desired temperature differential between the previously chilled fluid that is being used as a cooling medium and the fluid to be chilled. In the use of my process for the dewaxing of oil, the oil is dewaxed after it is chilled and when such dewaxed oil is used as a chilling medium in continuous operation, that previously chilled oil so used as a chilling medium will be of less volume, because of the removal of wax therefrom, than the incoming oil that is to be chilled; and since the precipitated wax has been removed from such chilled oil before it is used as a chilling medium, each unit volume thereof is capable of absorbing less heat for a given rise of the temperature thereof than must be taken from each similar unit volume of incoming oil that contains wax which must be precipitated by withdrawal of the heat in the oil and also of the latent heat of fusion of the wax. It is a further advantage of my invention that the addition of dewaxed oil that has passed through the heat exchange relation, to dewaxed oil that is first passing into heat exchange relation, will so increase the volume of dewaxed oil that is being used as a chilling medium as to facilitate the maintaining of uniform cooling and the maintaining of desired temperature differential throughout the period of such heat exchange relation.

In the second of the steps above mentioned a further and intermediate chilling is carried out by the circulation of a chilled cooling medium. One feature of this step is that the chilled cooling medium is circulated in counterflow heat exchange relation at such a rate and at such temperature that a uniform rate of cooling and the desired temperature differential between the cooling medium and the fluid to be cooled are maintained throughout the period of the heat exchange relation. In carrying out this step in accordance with my invention the cooling medium is circulated rapidly through a cooler and the storage tank; and the cooling medium that is to be passed in heat exchange relation with the fluid to be cooled is drawn from the cooling medium leaving the cooler while the remainder of the cooling medium leaving the cooler passes to the storage tank.

In the third of the above mentioned steps the fluid to be chilled is passed in direct heat exchange relation with an intense refrigerant such as a volatile liquid refrigerant, the same refrigerant being capable of use in the chilling of the cooling medium employed in the second step, and the fluid to be chilled being so far chilled in the third step that even after it is subjected to the treatment for which it is chilled, such as dewaxing, it is sufficiently cold to be used economically and with particular advantage as the cooling medium of the first step.

The third step above referred to embodies numerous features of my invention which may be utilized separately of conjointly. One such feature is that the refrigerant is caused to circulate in a heat exchange relation with the fluid to be chilled, by thermo-siphon action in which dense liquid in one leg of the siphon and warmer liquid, or boiling liquid containing bubbles of vapor, in the other leg of the siphon are advantageously maintained. Another such feature is that the temperature of the liquid volatile refrigerant that is in direct heat exchange relation with the substance to be chilled may be regulated or determined by controlling the temperature at which the refrigerant will boil at some available pressure, as by having present in the refrigerant a liquid, such as moisture, which by its presence changes the boiling temperature of the refrigerant at such a pressure, and so regulating the proportion of such other liquid as to produce the desired temperature.

Another such feature of the operation that is referred to hereinabove as the third step is that it may advantageously be divided into stages, and the substance to be chilled may be passed progressively through a plurality of similar cooling operations or stages in which it is in direct heat interchange relation with a volatile liquid refrigerant, and in each such operation or stage a uniform rate or extent of cooling and a uniform and suitable temperature differential between the substance and the refrigerant can nevertheless be maintained. And, the refrigerant is so employed in each such stage or operation that the temperature in the several stages decreases from stage to stage in the direction in which the substance to be chilled is flowing through such stages. Thus, the substance becomes further and further chilled as it flows through the several stages in series. When the chilling that is effected by direct heat interchange relation of liquid volatile refrigerant with the substance to be chilled, is so divided into stages the degree or extent of cooling and the temperature differential in each such stage may be determined or maintained merely by supplying liquid volatile refrigerant to each stage, either separately or in series but preferably the former, and controlling the pressure, and, therefore, the boiling temperature in each stage of the refrigerant therein, using sub-atmospheric pressure in any stage in which intense chilling is desired. However, it is a valuable and important feature of my invention that the temperature of the refrigerant in each such stage can be caused to bear the proper relation to the temperature of the substance to be chilled in that stage and to the temperature of the refrigerant in other such stages, by having present with the refrigerant in each stage another liquid, the presence of which changes the boiling point of the refrigerant at the existing pressure, and so regulating the proportion of such other liquid present as to produce the desired temperature; and it is a further feature of my invention that when such another liquid is maintained present with the refrigerant, the mixture can be flowed through the stages in series in counter-current to the flow through those stages in series of the substance to be chilled, and by withdrawing from each stage the refrigerant-vapors evolved therein, the proportion of such other liquid present will increase from stage to stage in the direction in which the refrigerant is flowing and the boiling point of the refrigerant will similarly increase from stage to stage in a direction opposite to that in which the substance to be chilled is flowing. It is a feature of such operation that all of the stages will not require purging and that usually only the last of such stages will have to be purged. In such operation any suitable liquid volatile refrigerant may be employed and any other liquid may be maintained present therewith so long as it exerts the necessary effect upon the boiling temperature of the refrigerant at the pressure employed. As an illustrative example, the liquid volatile refrigerant may be liquid ammonia and the other liquid may be moisture, in which case liquid ammonia obtained by the well known absorption process and containing moisture is well adapted as a refrigerant, and the concentration of moisture will increase from stage to stage and raise the boiling point of the refrigerant from stage to stage even though the pressure is the same in all stages. Also, in such operation the pressure may decrease in successive stages in the direction in which the substance to be chilled is flowing but refrigerant pumps may be dispensed with between the stages if the pressure is maintained the same in all stages. In an operation in which lower pressures including subatmospheric pressures are maintained in the last, or in all, stages through which the substance passes, a booster-compressor may be utilized to return the refrigerant to the condensing system, in order to avoid disruption of the control of the refrigerating system.

While I shall describe my invention in connection with the chilling of oil to effect precipitation of wax therein preparatory to dewaxing of the oil, it is to be understood that my invention is applicable to the chilling of other fluids for other purposes wherever the features of my invention are applicable.

Other and further objects, advantages, and features of my invention will appear from the following description taken in connection with the accompanying drawings in which like reference characters indicate similar parts, and in which Fig. 1 is a diagrammatic view of apparatus embodying my invention and whereby my process may be practiced;

Fig. 2 is a vertical sectional view, mainly diagrammatic, of one of the cooling units embodied in Fig. 1; and Fig. 3 is a vertical sectional view, mainly diagrammatic, of a modification of the form of unit shown in Fig. 2.

My invention and its several features will be described in connection with the chilling of oil preparatory to the dewaxing thereof although, as above stated, other fluids may be treated in the operations and by the apparatus now described; and features of my invention are capable of separate use.

Apparatus embodying my invention, when my invention is considered as a whole, comprises a plurality of tanks indicated in the drawings by reference numerals 10 to 18 inclusive, the number of tanks employed being varied to suit the conditions encountered. The fluid to be chilled, such as diluted wax-containing oil, is introduced to the first tank through inlet 20 and is chilled as it passes through successive tanks, being discharged from the last tank through outlet 21. Chilled oil to be dewaxed is conducted from outlet 21 to a suitable wax-removal apparatus 22 through pipe 23. Chilled dewaxed oil passes through pipe 24 to the cooling system of the first tanks, which are connected in the manner shown, by pipes 25 and 26. In the construction shown in the drawings tanks 10, 11 and 12 contain cooling coils 27 that are connected in series as shown to provide counter-current flow between oil to be chilled and chilled dewaxed oil. Dewaxed oil is withdrawn from pipe 24 and passed into coil 27 of tank 12 by means of pump 28; and reheated dewaxed oil is withdrawn from coil 27 of tank 10 through pipe 29. Merely as an illustrative example oil passing from the chilling system may have a temperature of —40° F. and oil passing through pipe 24 may have a temperature of —10° F. For reasons well known precipitation of wax in oil must not be effected by shock chilling and therefore reheated dewaxed oil is withdrawn from pipe 29 through pipe 30 which is controlled by valve 31 and passed into the inlet of pump 28 in such predetermined quantity that the oil passing through coils 27 will have a proper temperature differential with respect to the oil passing through tanks 10, 11 and 12 and will flow at such rate that an equal amount of cooling will be effected in each tank. The dewaxed oil coming through pipe 24 will be less in volume than the wax-containing oil entering inlet 20, and each unit volume of such oil that is freed of precipitated wax will be capable of absorbing less heat than a similar unit of wax-containing oil is capable of giving off in the chilling of such oil and the precipitation of the wax therein. The dewaxed oil merely absorbs heat with a consequent rise in its temperature but reduction of temperature of the wax-containing oil requires a removal of heat to reduce its temperature and an additional removal of the latent heat of fusion of the precipitating wax; but the oil passing through pipe 30 will cause the quantity of oil passed through pipe 27 to be equal to, or preferably to exceed, the quantity of oil entering inlet 20 and thereby enable the maintaining of the conditions just described.

Oil partly chilled in this first step is conducted by pipe 32 into tank 13 as shown for the second chilling step above mentioned. Tanks 13, 14 and 15 are connected as shown by pipes 33 and they contain cooling coils 34 connected in series as shown and through which cooling medium such as brine is circulated. The brine is passed from tank 35 by pump 36 through coil 37 of cooling unit 38, and the major portion of the cold brine leaving coil 37 is conducted by pipe 39 back to tank 35 under the control of pressure relief valve 90 in pipe 39. However, valve-controlled pipe 40 conducts cold brine into the first coil 34 and brine is returned from the last coil 34 to tank 35 by pipe 41. Cooling unit 38 is cooled by refrigerant drawn from tank 42 by pipe 43, the refrigerant being returned to the condensing system by pipe 44. Any type of refrigerating apparatus, indicated at 45, may be employed for maintaining a supply of suitable liquid volatile refrigerant in tank 42, embodying either a compression element or an absorption element. In order to obtain substantially the same amount of cooling in each of the tanks 13, 14 and 15 and in order to preserve the proper temperature differential between the cooling medium and the oil, the rate at which cooling medium is circulated through coils 34 is controlled by valve 46 in pipe 40. Excess cooling medium passed through coil 37 by pump 36 is returned to tank 35 to maintain a continuous circulation through the cooling coil and the maintaining of the above described conditions is facilitated.

Partly-chilled oil is conducted from tank 15, and thus from the second step of the chilling operation, through pipe 51, as shown, to tank 16 and thus to the third chilling step. Tanks 16, 17 and 18 are connected by pipes 52 as shown and in these tanks the oil is brought into direct heat exchange relation with the refrigerant supplied from the main refrigerant pipe 43. Resulting vapors of the refrigerant are conducted from each of the units comprising tanks 16, 17 and 18 respectively by pipes 54 controlled by valves 60. The vapor pipes 54 discharge into a vapor header 57 which communicates directly with vapor return pipe 44 through valved pipe 61 or indirectly through a booster compressor 58. If the valve in pipe 61 is open and the valves A and B in pipe 57 are open the suction of the refrigerant condensing system 45 or the pressure thereof acts upon all of the pipes 54; but if valve 47 is open the suction of the booster compressor 58 will be applied to the vapor pipe 54 of tank 18 if valve A is closed and will be applied also to vapor pipe 54 of tank 17 if valve B is closed and valve A is opened and will be applied to vapor pipe 54 of all of the tanks 16, 17 and 18 if the valve in pipe 61 is closed and valves A and B are open in addition to valve 47. Thus different refrigerant pressures or the same refrigerant pressure may be maintained in the several tanks 16, 17 and 18. In each of said tanks the refrigerant is confined in a coil as hereinafter more fully described and liquid volatile refrigerant may be supplied separately to the coil in each said tank respectively by pipes 53 controlled by valves 70 and leading from the liquid volatile refrigerant supply pipe 43 which leads from tank 42 in which liquid refrigerant is maintained under pressure. Or, the valves 70 in the refrigerant pipes 53 leading to tanks 16 and 17 may be closed, and liquid volatile refrigerant may be supplied only to the coil in tank 18 through its pipe 53. In such case liquid volatile refrigerant from the coil in tank 18 is conducted by pipe 91 to the coil in tank 17, and from the coil in tank 17 by pipe 92 to the coil in tank 16. If different pressures are maintained upon the refrigerant in the coils in tanks 16, 17 and 18, pipes 91 and 92 will be provided respectively with pumps 96 and 97; but if the same pressure is maintained upon the refrigerant in the coils of all of those tanks, pumps 96 and 97 may be omitted. When the refrigerant is passed in series through the coils of the several stages of chilling, the refrigerant in the coil of tank 16 of the first stage of chilling, which is the last coil through which the refrigerant is passed, may contain certain impurities, such as water, accumulated by reason of the evaporation of the refrigerant in the coils leaving impurities. Where, for example, the spent refrigerant is recovered by absorption in water and is redistilled from the water prior to recirculation, some water tends to be present in the refrigerant after distillation and to accumulate as aforesaid. The liquid refrigerant in the coil in tank 16 may be purged for cleansing and removal of impurities from time to time as required by a valved pipe 93 which conducts liquid to purging tank 95 from which it is returned in any desired manner to the refrigerant condensing system. The refrigerant coils in tanks 17 and 18 can be purged through valved pipes 81 and 82 leading respectively from pipes 91 and 92 to pipe 93, said pipes having any suitable arrangement of valves.

The bringing of the liquid volatile refrigerant into direct heat exchange relation with the oil in the several stages of this step of the chilling operation may be effected in different ways in accordance with my invention. Thus the several units which respectively include the tanks 16, 17 and 18, may possess different constructional features. In Fig. 2 there is shown one of such units, which may be any one of the several units shown in Fig. 1, for example the unit that includes tank 16. In this unit tank 16 is supplied with oil through pipe 51 and oil is withdrawn through pipe 52. Within the unit there is a header 62 of relatively large volume and a header 63 and tubes 64 extend vertically between these headers. Header 62 extends into a chamber 65 which is preferably provided with plates 66 of any type to prevent escape of liquid, and vapor return pipe 54 controlled by valve 60 leads from chamber 65. From the lower part of chamber 65 leads a downflow pipe 67 that discharges into lower header 63. Preferably downflow pipe 67 passes into tank 16 and is lagged to ensure high density and low temperature of the liquid descending therein while the liquid rising in tubes 64 will be heated by the oil in tank 16 and will therefore usually boil and contain vapor bubbles which reduce the density of the liquid. Thus the refrigerant will be circulated within the cooling coils of the tank by thermo-siphon action. Fresh quantities of refrigerant, to make up for the refrigerant passing off as a vapor through pipe 54, are supplied through pipe 53 which may discharge into chamber 65 under control of float operated valve 71. As a precaution downflow pipe 67 may be provided with a valve-controlled by-pass 68 containing a pump 69, the use of which may be desirable in starting or hastening the circulation due to thermo-siphon action. If refrigerant is not supplied through pipe 53 but comes from the cooling coil in tank 17 it will enter header 63 through pipe 92. The purging pipe 93 preferably leads from the lower header 63 of the cooling coil.

In the chilling unit shown in Fig. 3, tank 16 may be any one of the several units of the third step of the chilling operation, being supplied through pipe 51 with fluid to be chilled that is withdrawn through pipe 52. The cooling coil comprises header 62, tubes 64 and lower header 63. From the lower header to the upper header leads a return pipe 167 in which is located a pump 84. Resultant vapors of the refrigerant are passed from header 62 through pipe 54 which is controlled by valve 60. Liquid refrigerant supplied through pipe 53 may be introduced to any suitable part of the cooling coil, as by being fed into pipe 167 under the control of valve 70. The amount of liquid refrigerant supplied will be sufficient to maintain a quantity of liquid refrigerant in circulation under the action of pump 84. The liquid refrigerant entering header 62 through pipe 167 will be caused to flow downward in only an outer zone of tubes 64 by any suitable means such as nipples 85 which are located in the upper ends of tubes 64, which are provided with a passage 168 therethrough and which may be so formed externally, with helical ridges on their outer surface, or otherwise, as to impart a swirling motion to liquids flowing downward in tubes 64.

It will be apparent that in the construction shown in Fig. 3 the effect of vacuum maintained by a booster will be exerted throughout the cooling coils and particularly in the header 62 and the tubes 64 because the tubes 64 are not filled with a solid body of liquid. The nipples 85 being hollow as shown at 168 any gas pressure generated by the vaporization of the refrigerant in tubes 64 is at once relieved. There is a substantially uniform vacuum in said tubes and in header 62.

Merely as an example of the application of my invention diluted wax-containing oil which has been heated to about 100° F. to ensure solution of the wax, may be introduced through inlet 20 and withdrawn from outlet 21 at a temperature as low as —45° F. The dewaxed oil is so cold that it may be employed, with economical advantage, to effect the first cooling and even though very cold it is employed in accordance with my invention in such a manner that the proper temperature differential is maintained and substantially uniform amounts of cooling are effected in each of the several cooling units utilized. While a chilled medium is thereafter employed it is circulated in such a manner that a desirable temperature differential is maintained and substantially uniform cooling is effected in the several units utilized, these advantages resulting from the features of the circulating system described. Cooling by heat interchange with a chilled medium is carried as far as possible with due regard for economical operation. Subsequent chilling is effected by direct heat interchange with a refrigerating medium, of which ammonia is an example of the many suitable media available. By maintaining an available vacuum and by controlling the pressure in each such unit, the maintenance of the desired temperature differential and extent of cooling are facilitated. By maintaining another liquid present with the refrigerant and by regulating the proportion thereof present, as above set out, temperature control in each chilling stage is facilitated, and the refrigerant can be passed through the stages in series, and the same pressure can be maintained in each stage, and only the last stage of such series need be purged. In the apparatus shown provision is made for very careful control of the circulation of the refrigerant in order that intense chilling may be effected, as by obtaining refrigerant temperatures as low as —55° F. when ammonia is employed.

If the chilling produces a precipitate, such as wax precipitated from oil, the several tanks may each be provided with an agitating blade 83 driven by a shaft 86 passing through a stuffing box 87, said shaft and blade being operatively connected by gears 88.

While I have shown and described in great detail one embodiment of my process and certain constructions embodying my invention, I do not intend that my invention shall be limited to such details but intend that it shall include such variations and modifications as fall within the hereunto appended claims. In this connection it is to be noted that many variations may be made in the form and construction of the apparatus whereby my process is practiced, and particularly in the units in which the substance to be chilled is in direct heat exchange relation with a volatile liquid refrigerant. Also, it is to be noted that in the practice of my invention, and in the operations in which chilling is effected by maintaining a substance in direct heat interchange relation with a volatile liquid refrigerant, the chilling is dependent upon the temperature of the liquid, and the cooling of that liquid and its circulation are effected in various ways. Cooling is the result of vaporization which absorbs heat and causes a reduction of temperature. The cooling may occur wholly or partly while the liquid refrigerant is in heat exchange relation with a substance to be chilled or wholly or partly while the refrigerant is out of that relation. The cooling may be brought about by withdrawal of evolved vapors or by a reduction in the pressure acting upon the liquid or at any point of low pressure in the circulating system, or otherwise, so long as a cooling of the liquid is effected. The cooling of the liquid refrigerant may be carried out while the liquid is in heat exchange relation with the substance to be chilled or at an adjacent point or at a relatively remote point. In the construction shown in Fig. 2 the liquid at the bottom of tubes 64 has a pressure acting upon it due to the head of liquid in those tubes, and as it rises in those tubes the pressure upon it decreases, and near the top of those tubes vaporization will occur and bubbles will form and cooling will begin; and cooling will also occur in the upper header 62 and it will occur in chamber 65 where the pressure is at a minimum and where vapor is being withdrawn and the liquid passing down in tube 67 will be heavy because of its low temperature and dense because of its freedom from bubbles, and thermo-siphon circulation will be promoted. In this construction the cooling step occurs between a point at which the liquid volatile refrigerant is in heat exchange relation with the substance to be cooled and the point at which the liquid is flowing down in tube 67.

I claim:

1. In the dewaxing of oil by precipitating wax therein by chilling and then removing the precipitated wax, the process comprising first passing the wax-containing oil in heat exchange relation with cold dewaxed oil, then passing the wax-containing oil in heat exchange relation with a chilled non-volatile cooling medium, and then passing the wax-containing oil in direct heat exchange relation with a volatile refrigerant while limiting to avoid shock chilling the temperature differential between the wax-containing oil and the dewaxed oil and non-volatile medium and volatile refrigerant, dewaxing the chilled oil, and passing the dewaxed oil while still cold to the first-mentioned heat exchange step.

2. In the dewaxing of oil by precipitating wax therein by chilling and then removing the precipitated wax, the steps comprising first passing the wax-containing oil in heat exchange relation with cold dewaxed oil, then passing the wax-containing oil in heat exchange relation with a chilled cooling medium, and then passing the wax-containing oil in direct heat exchange relation with a volatile refrigerant, dewaxing the chilled oil, and passing the dewaxed oil while still cold to the first mentioned heat exchange step together with a predetermined quantity of dewaxed oil that has passed through said step.

3. In the dewaxing of oil by precipitating the wax by chilling and then removing the precipitated wax, the steps comprising first passing the unchilled wax-containing oil in heat exchange relation with cold previously chilled dewaxed oil which has mixed with it a predetermined proportion of reheated dewaxed oil previously passed in heat exchange relation with the unchilled oil, thereafter passing the oil so partly chilled in heat exchange relation with a volatile refrigerant, dewaxing the oil so chilled, and returning the dewaxed oil while still cold to the first heat exchange operation.

4. In the dewaxing of oil by precipitating the wax by chilling and then removing the precipitated wax, the steps comprising passing the oil in heat exchange relation with dewaxed previously chilled oil, then further chilling the oil, dewaxing the finally chilled oil, and returning the dewaxed oil while still cold to the first mentioned heat exchange operation together with a predetermined quantity of dewaxed oil that has passed through said first mentioned heat-exchange operation.

5. In the dewaxing of oil by precipitating the wax by chilling and then removing the precipitated wax, the steps comprising passing the oil in heat exchange relation with dewaxed previously chilled oil, then further chilling the oil, dewaxing the finally chilled oil, and returning the dewaxed oil while still cold to the first mentioned heat-exchange operation together with a quantity of dewaxed oil that has passed through said first mentioned heat-exchange operation sufficient to cause the volume of dewaxed oil entering said first mentioned heat-exchange operation to be at least substantially equal to the volume of wax-containing oil entering that operation.

6. In a chilling of oil, the process comprising maintaining a body of brine, circulating brine therefrom through a refrigerating operation and back to said body of brine, by-passing a part of the brine returning to said body thereof, and passing the by-passed brine alone into counter-flow heat exchange relation with the oil.

7. In the chilling of oil to effect precipitation of wax therein, the process comprising maintaining a circuit of refrigerating medium, passing the oil to be chilled in heat exchange relation with such circuit, maintaining a sub-atmospheric pressure within said circuit by withdrawal of vapor therefrom, and so circulating liquid volatile refrigerant continuously around said circuit that the sub-atmospheric pressure acts substantially uniformly upon the refrigerant in substantially all parts of said circuit.

8. In a chilling of substances, the steps comprising maintaining the substance to be chilled in heat exchange relation with a body of liquid volatile refrigerant mixed with another liquid that changes the boiling temperature of the refrigerant at the existing pressure, and regulating the boiling temperature of the refrigerant by controlling the proportion present therein of such other liquid.

9. In the chilling of substances, the steps comprising maintaining the substance to be chilled in heat exchange relation with a body of liquid volatile refrigerant mixed with another liquid that changes the boiling temperature of the refrigerant at the existing pressure, regulating the boiling temperature of the refrigerant by controlling the proportion present therein of such other liquid, and controlling the pressure acting upon the refrigerant, and thereby controlling the temperature produced by the refrigerant.

10. In the chilling of substances, the steps comprising passing the substance to be chilled counter-current to and in heat exchange relation with volatile liquid refrigerant mixed with another liquid that changes the boiling temperature of the refrigerant at the existing pressure, and regulating the proportion of such other liquid present in the refrigerant from point to point in its flow and thereby controlling the temperature produced by the refrigerant.

11. In the chilling of substances, the steps comprising passing the substance to be chilled counter-current to and in heat exchange relation with volatile liquid refrigerant mixed with another liquid that changes the boiling temperature of the refrigerant at the existing pressure, and regulating the proportion of such other liquid present in the refrigerant from point to point in its flow and the pressure on the refrigerant and thereby controlling the temperature produced by the refrigerant.

12. In the chilling of substances, the steps comprising passing the substance through a plurality of stages counter-current to and in heat-exchange relation with a liquid volatile refrigerant mixed with another liquid that increases the boiling temperature of the mixture, and withdrawing in each stage the vapors evolved from the mixture therein and permitting the proportion of such other liquid in the mixture to increase.

13. In chilling apparatus a plurality of chilling units connected in series for the passage of a fluid to be chilled, a refrigerating coil in heat exchange relation with the fluid to be chilled in each of said units, means for supplying liquid volatile refrigerant to each of said coils, and means for withdrawing vapor of the refrigerant from said respective coils at successively lower pressures.

14. In chilling apparatus, opposed headers, tubes between said headers, means for passing a substance to be chilled in heat exchange relation with said headers and tubes, a conduit between said headers out of heat exchange relation with the fluid to be cooled which completes a circuit of liquid-chilling medium, and means for circulating said chilling-medium in said circuit.

15. In the chilling of substances with a volatile liquid refrigerant, the steps comprising the circulating of said refrigerant in a flooded circuit part of which is in heat exchange relation with the substance to be cooled and part of which comprises a partially filled chamber out of contact with the substance to be cooled, vaporizing some of said liquid in said chamber with resultant lowering of temperature of liquid remaining in said chamber, withdrawing vapors from said chamber at a predetermined pressure, maintaining the pressure in said chamber at or below that in the remainder of said circuit, supplying liquid volatile refrigerant to said circuit, and maintaining a substantially constant level of liquid in said chamber by controlling the inflow of fresh liquid into said circuit.

16. In chilling apparatus, the combination comprising opposed headers at different levels, vertically extending tubes between said headers, means for passing a substance to be chilled in heat exchange relation with said headers and tubes, a chamber and conduit between said headers completing a vertical circuit and out of heat exchange relation with said substance to be cooled, means for maintaining said headers and tubes flooded with volatile liquid refrigerant, means for maintaining said chamber only partially filled with said refrigerant, and means for withdrawing vaporized refrigerant from said chamber.

17. In the dewaxing of oil by precipitating wax therein by chilling and then removing the precipitated wax, wherein the wax-containing oil is passed in heat exchange with chilled oil that has been dewaxed, the step comprising adding to the chilled dewaxed oil from the wax-separation step a quantity of dewaxed oil sufficient to cause the volume of dewaxed oil entering the said chilling operation to be at least substantially equal to the volume of wax-containing oil entering the said operation.

18. In the dewaxing of oil by precipitating wax therein by chilling and then removing the precipitated wax, wherein the wax-containing oil is passed in heat exchange with chilled oil that has been dewaxed, the step comprising so proportioning the volumes of chilled dewaxed oil and wax-containing oil entering the heat exchange operation that the heat absorptive capacity of said chilled dewaxed oil for a given rise in the temperature thereof is substantially equal to the heat yielding capacity of the wax-containing oil for a similar decrease in temperature thereof during said counterflow of said chilled dewaxed oil in heat-exchange relation with said wax-containing oil.

19. In the chilling of substances with a volatile liquid refrigerant, the steps comprising maintaining a quantity of said refrigerant in a liquid state in a vaporization chamber, vaporizing some of said liquid with resultant lowering of temperature of the liquid remaining in said chamber, maintaining in a flooded circuit a flow of said chilled liquid from said chamber and into heat exchange with a substance to be chilled, and then back to said vaporization chamber, while maintaining the pressure in said chamber at or below that in the circuit.

20. In the chilling of substances with a volatile liquid refrigerant, the steps comprising maintaining a quantity of said refrigerant in a liquid state in a vaporization chamber out of heat-exchange relation with the substance to be cooled, vaporizing some of said liquid with resultant lowering of temperature of the liquid remaining in said chamber, and bringing said chilled liquid into heat exchange with the substance to be cooled by thermo-siphon circulation, while maintaining the pressure in said chamber at or below the pressure on the liquid in heat-exchange relation with the substance to be chilled.

21. In the dewaxing of oil by precipitating wax therein by chilling and then removing the precipitated wax, the steps comprising passing a chilling medium into heat-exchange relation with a volatile refrigerant and then directly into heat-exchange relation with wax-containing oil, then passing the oil cooled by heat exchange with the medium into direct heat-exchange relation with the volatile refrigerant, dewaxing the oil so chilled, and passing the dewaxed oil while still cold into heat-exchange relation with the wax-containing oil passing to heat-exchange relation with said chilling medium, together with a predetermined quantity of dewaxed oil that has been passed in heat-exchange relation with wax-containing oil.

22. In the dewaxing of oil by precipitating wax therein by chilling and then removing the precipitated wax, the steps comprising passing a chilling medium into heat-exchange relation with a volatile refrigerant and then directly into heat-exchange relation with wax-containing oil, then passing the oil cooled by heat exchange with the medium into direct heat-exchange relation with the volatile refrigerant, dewaxing the oil so chilled, and passing the dewaxed oil while still cold into heat-exchange relation with the wax-containing oil passing to heat-exchange relation with said chilling medium.

23. In the dewaxing of oil by precipitating the wax by chilling and then removing the precipitated wax, the steps comprising passing a chilling medium into heat-exchange relation with a volatile refrigerant and then directly into heat-exchange relation with wax-containing oil, then passing the oil cooled by heat exchange with the medium into direct heat-exchange relation with the volatile refrigerant, and dewaxing the oil so chilled.

24. In the chilling of oil for the precipitation of wax therein, the process comprising passing a chilling medium into heat-exchange relation with a volatile refrigerant and then out of that relation directly into heat-exchange relation with wax-containing oil, then passing the oil out of heat-exchange relation with the medium and into heat-exchange relation with the refrigerant, and regulating the rate of flow of the chilling medium and the rate of evaporation of the refrigerant in heat-exchange relation with the oil to maintain such difference in temperature between the oil and the medium and between the oil and the refrigerant in heat-exchange relation therewith as will effect reduction of the temperature of the oil by non-shock chilling.

25. In the chilling of oil for the precipitation of wax therein, the process comprising passing a chilling medium into heat-exchange relation with a volatile refrigerant and then out of that relation directly into heat-exchange relation with wax-containing oil, then passing the oil out of heat-exchange relation with the medium and into heat-exchange relation with the refrigerant, and limiting to avoid shock-chilling of the oil the temperature differential between the oil and the medium and between the oil and the refrigerant in heat-exchange relation with the oil.

26. In the chilling of fluid, the steps comprising passing the fluid successively into heat-exchange relation with separate bodies of volatile refrigerant in liquid form, supplying liquid volatile refrigerant to said bodies and thereby maintaining said bodies of liquid, withdrawing vapor separately from each of said bodies, and regulating the rate of withdrawal of vapor from said bodies relatively to the rate of supply of liquid refrigerant thereto and maintaining successively lower pressures on the respective bodies of liquid.

27. In the chilling of fluid, the steps comprising passing the fluid successively into heat-exchange relation with separate heat-exchange elements, supplying liquid volatile refrigerant to said elements and maintaining them substantially flooded therewith, withdrawing vapor separately from each of the resulting bodies of liquid refrigerant, and controlling the rate of withdrawal to maintain successively lower pressures on the respective bodies of liquid.

28. In the chilling of fluid, the steps comprising passing the fluid successively into heat-exchange relation with separate bodies of volatile refrigerant in liquid form, supplying liquid volatile refrigerant to said bodies and thereby maintaining said bodies of liquid, withdrawing vapor separately from each of said bodies, and controlling the extent to which the suction withdrawing said vapor acts upon each of said bodies of liquid and thereby maintaining successively lower pressures on the respective bodies of liquid.

29. In the chilling of fluid, the steps comprising passing the fluid successively into heat-exchange relation with separate bodies of volatile refrigerant in liquid form, supplying liquid volatile refrigerant to said bodies and thereby maintaining said bodies of liquid, passing vapors from said bodies of liquid, and controlling the flow of vapors passing from said bodies of liquid to maintain successively lower pressures on the respective bodies of liquid.

30. In the chilling of fluid, the steps comprising passing the fluid successively into heat-exchange relation with separate bodies of volatile refrigerant in liquid form, and separately controlling the flow of vapors from each of said bodies of liquid to maintain successively lower pressures on the respective bodies of liquid.

31. In the chilling of oil to effect precipitation of wax therein, the steps comprising maintaining a vertical flow of volatile refrigerant in liquid form and confined in a space which at substantially all points of said vertical flow has a transverse area in excess of the transverse area of the flowing liquid, whereby said space is unsealed by liquid at substantially all points of the vertical flow of the liquid, passing the oil in heat-exchange relation with the flowing liquid to effect precipitation of wax therein by reduction of temperature thereof, and maintaining sub-atmospheric pressure acting substantially uniformly upon the liquid at substantially all levels of the vertical flow thereof.

32. In the chilling of oil to effect precipitation of wax therein, the steps comprising maintaining a vertical flow of volatile refrigerant in liquid form, maintaining a substantially unbroken body of vapor in contact with the flowing liquid throughout substantially the entire vertical extent of said flow whereby uniform pressure substantially unvaried by head of liquid refrigerant acts upon the liquid throughout the extent of vertical flow thereof, maintaining subatmospheric pressure upon the vapor, and passing oil in heat-exchange relation with the flowing liquid and the vapor in contact therewith to effect precipitation of wax therein by reduction of temperature thereof.

33. In chilling apparatus, a plurality of chilling elements, means for passing fluid to be chilled successively into heat-exchange relation with said elements, means to supply liquid volatile refrigerant to all of said elements, and separate means for passing vapor from each of said units at a controlled rate, whereby successively lower pressures are maintained in the respective units.

34. In chilling apparatus, superposed headers, vertical tubes between said headers, means for passing a substance to be chilled in heat-exchange relation with said headers and tubes, a conduit between said headers out of heat-exchange relation with the fluid to be cooled which completes a circuit of liquid-chilling medium, means for circulating said chilling-medium in said circuit, and separate means for supplying liquid volatile refrigerant to said circuit and for withdrawing vapor therefrom.

35. In chilling apparatus, a circuit for fluid refrigerant comprising a heat-exchange element, a vaporizing chamber, and fluid connections leading from said chamber respectively to spaced points of said element; means for maintaining in heat-exchange relation to said element a substance to be chilled; a vapor vent for said chamber; means for supplying volatile refrigerant in liquid form to said circuit; means for automatically controlling the flow of liquid from said supply to said circuit in accordance with the level of liquid therein to maintain said element flooded; and a pump for circulating liquid through said circuit.

36. In chilling apparatus, a circuit for fluid refrigerant comprising a heat-exchange element, a vaporizing chamber, and free fluid connections leading from said chamber respectively to spaced points of said element; means for maintaining in heat-exchange relation to said element a substance to be chilled; a vapor vent for said chamber; means for supplying volatile refrigerant in liquid form to said circuit; and a pump for circulating liquid through said circuit.

37. In chilling apparatus, a circuit for fluid refrigerant comprising a heat-exchange element, a vaporizing chamber, and free fluid connections leading from said chamber respectively to spaced points of said element; means for maintaining in heat-exchange relation to said element a substance to be chilled; a vapor vent for said chamber; means for supplying volatile refrigerant in liquid form to said circuit; and a pump in the connection in which fluid flows from said chamber to said element for circulating liquid through said circuit.

38. In the chilling of substances with a volatile liquid refrigerant, the steps comprising alternately passing liquid volatile refrigerant into a chamber out of heat-exchange relation with a substance to be chilled and then passing the liquid into heat-exchange relation with a substance to be chilled, while vaporizing some of the liquid in said chamber with resultant cooling of the unvaporized liquid in the chamber and maintaining the pressure in the chamber at or below the pressure on the liquid that is in heat-exchange relation with the substance to be chilled.

IRVING C. CARPENTER.

CERTIFICATE OF CORRECTION.

Patent No. 1,962,580.

June 12, 1934.

IRVING C. CARPENTER.

It is hereby certified that error appears in the printed specification of the above numbered patent requiring correction as follows: Page 5, line 96, claim 6, for "a" read the; and line 107, claim 7, after "circuit" and before the comma insert the words to effect precipitation of wax therein; and line 114, claim 8, for "a" read the; and that the said Letters Patent should be read with these corrections therein that the same may conform to the record of the case in the Patent Office.

Signed and sealed this 24th day of July, A. D. 1934.

Bryan M. Battey (Seal)

Acting Commissioner of Patents.

in heat-exchange relation to said element a substance to be chilled; a vapor vent for said chamber; means for supplying volatile refrigerant in liquid form to said circuit; and a pump for circulating liquid through said circuit.

37. In chilling apparatus, a circuit for fluid refrigerant comprising a heat-exchange element, a vaporizing chamber, and free fluid connections leading from said chamber respectively to spaced points of said element; means for maintaining in heat-exchange relation to said element a substance to be chilled; a vapor vent for said chamber; means for supplying volatile refrigerant in liquid form to said circuit; and a pump in the connection in which fluid flows from said chamber to said element for circulating liquid through said circuit.

38. In the chilling of substances with a volatile liquid refrigerant, the steps comprising alternately passing liquid volatile refrigerant into a chamber out of heat-exchange relation with a substance to be chilled and then passing the liquid into heat-exchange relation with a substance to be chilled, while vaporizing some of the liquid in said chamber with resultant cooling of the unvaporized liquid in the chamber and maintaining the pressure in the chamber at or below the pressure on the liquid that is in heat-exchange relation with the substance to be chilled.

IRVING C. CARPENTER.

CERTIFICATE OF CORRECTION.

Patent No. 1,962,580.

June 12, 1934.

IRVING C. CARPENTER.

It is hereby certified that error appears in the printed specification of the above numbered patent requiring correction as follows: Page 5, line 96, claim 6, for "a" read the; and line 107, claim 7, after "circuit" and before the comma insert the words to effect precipitation of wax therein; and line 114, claim 8, for "a" read the; and that the said Letters Patent should be read with these corrections therein that the same may conform to the record of the case in the Patent Office.

Signed and sealed this 24th day of July, A. D. 1934.

Bryan M. Battey (Seal)

Acting Commissioner of Patents.